Oct. 28, 1969  T. BEN MENA ET AL  3,475,100
APPARATUS FOR ADJUSTING THE PASS-BAND OF A SPECTROMETER
Filed July 14, 1966  3 Sheets-Sheet 1

United States Patent Office 3,475,100
Patented Oct. 28, 1969

3,475,100
APPARATUS FOR ADJUSTING THE PASS-BAND
OF A SPECTROMETER
Taoufik Ben Mena, Paris, Robert Chabbal, Orsay, and Simon Gerstenkorn, Paris, France, assignors to Commissariat a l'Energie Atomique, Paris, France
Filed July 14, 1966, Ser. No. 565,211
Claims priority, application France, July 21, 1965, 25,526
Int. Cl. G01j 3/12; G02f 1/34
U.S. Cl. 356—100                                            2 Claims

ABSTRACT OF THE DISCLOSURE

The pass-bands of a grating type monochromator controlled by a variable orientation optical plate and of a pass-band selector forming a spectrometer are shifted by controlling the angle of rotation of the optical plate by the pressure of the gas in the selector.

Figure 2:
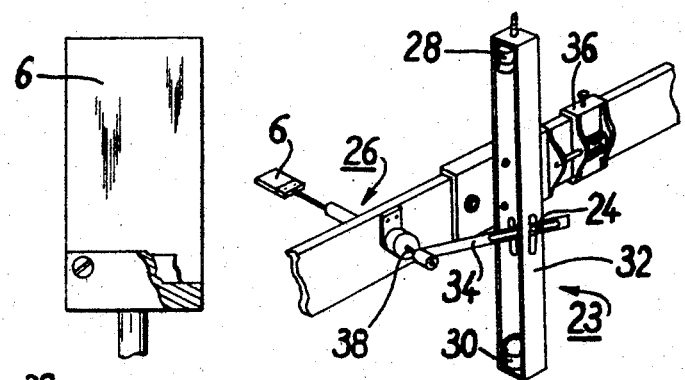

This invention relates to a method of and apparatus for the adjustment of the pass-band of a spectrometer of the kind comprising a grating-type monochromator controlled by a plate having parallel surfaces and hereinafter referred to as an optical plate, and a variable optical thickness band selector.

When hyperfine structures have to be studied by means of such a spectrometer, the pass-band of the monochromator used may be much wider than the interval explored by the pass-band selector. The pass-band of the monochromator remains fixed during exploration of the hyperfine structure. If, on the other hand, very dense spectra are to be studied by absorption spectrometry, the pass-band of the monochromator must be fine enough to suppress the pass-band selector transmission peaks directly adjacent the useful peak. The pass-band of the monochromator is then about 25 times wider than that of the band selector. Under these conditions, during exploration of the spectrum the pass-band of the selector must remain within that of the monochromator. Only if this condition is satisfied does total transmission of the spectrometer remain constant during exploration of the spectrum.

Some spectrometers of the above-defined kind have grating drive systems whereby the monochromator pass-band can be shifted. Such a drive is relatively coarse and does not enable the pass-band to be shifted accurately enough for the problem already indicated. A very slow exploration system must then be introduced, which is not required to explore a spectral interval greater than that which can be explored by a band selector, i.e., an interval of a few cm.$^{-1}$.

A pass-band selector of this type used for the above purposes consists of two plates (for example of glass or silica) whose facing surfaces are perfectly flat and held in parallel relationship in a frame, said two plates being separated by a layer of gas, the pressure of which is strictly controlled.

The mean wavelength of the radiation transmitted by a band selector of the above type is $2Ne/K$ where:

N is the index for the gas contained between the two glass cylinders,
e is the thickness of the layer of air separating the two cylinders, and
K is an integer.

Linear exploration of the spectrum under study is obtained by linear variation of the index N of the gas contained between the two band selector cylinders, i.e., linear variation of the pressure of said gas. Also, to move the passband of the monochromator the image of the entry slit must be moved past the exit slit. Such movement may be obtained by rotation of an optical plate situated between the entry slit and the grating monochromator collimator.

To shift the pass-band of the spectrometer used, the above condition must be satisfied, i.e., the pass-bands of the monochromator and of the band selector must be simultaneously adjusted so that the pass-band of the second device is always contained within that of the first.

This invention relates to a method of shifting the pass-bands of the grating monochromator and the band selector provided in a spectrometer of the above type, such method enabling the above condition to be satisfied with none of the disadvantages of the prior art methods.

The invention also relates to apparatus for carrying out such a method.

According to the invention there is provided a method of simultaneously shifting the pass-bands of, respectively, a grating-type monochromator controlled by a variable-orientation optical plate, and a pass-band selector forming a spectrometer which keeps the pass-band of the first component inside the pass-band of the second component, said method comprising controlling the angle of rotation of the optical plate by the pressure of the gas in the selector, said angle of rotation being proportional to the variations of the said pressure.

The apparatus for carrying out the above method is characterised in that a rod secured between a stack of pressure capsules subjected to the pressure under study and a stack of pressure capsules subjected to a reference pressure undergoes a rectilinear movement of translation the amplitude of which is a measurement of said pressure and in that said rod bears against a lever turning about a pivot, the orientation of said lever controlling the angular position of the optical plate.

According to one preferred embodiment, the point at which the rod attacks the level varies linearly as a function of the mean wavelength of the range of radiation under study.

The complete system operates satisfactorily, is simple to construct and can be rapidly adjusted.

Figure 5:
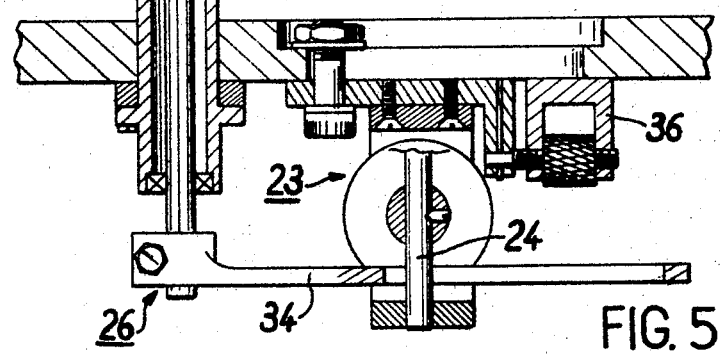
Figure 1:
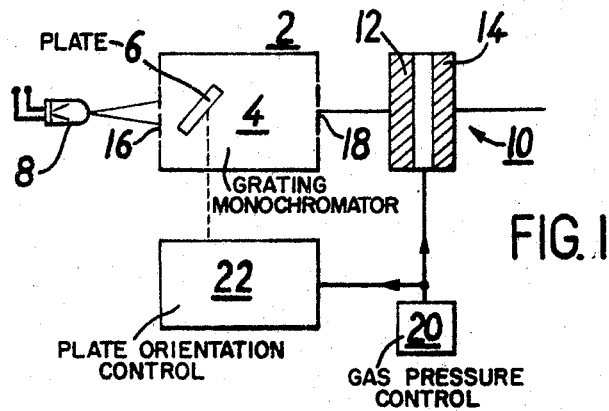
Figure 3:
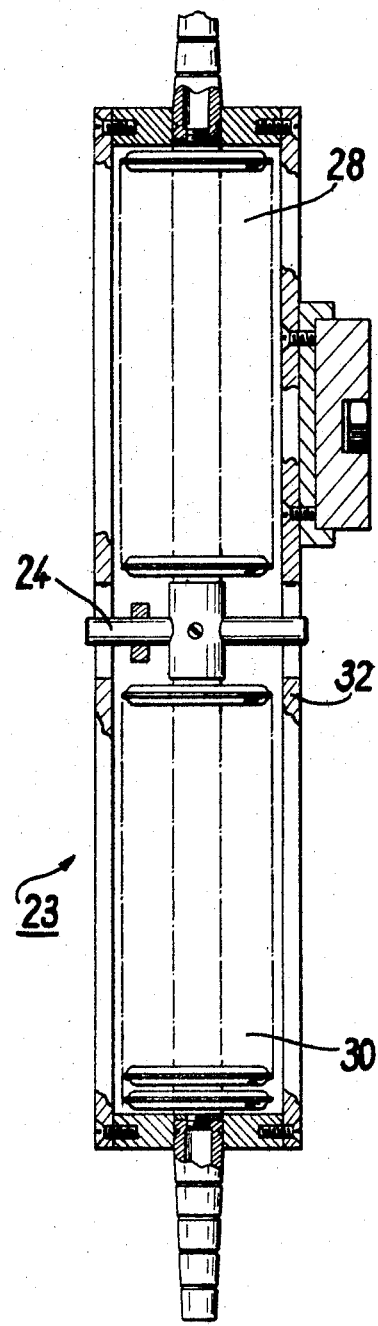
Figure 4:
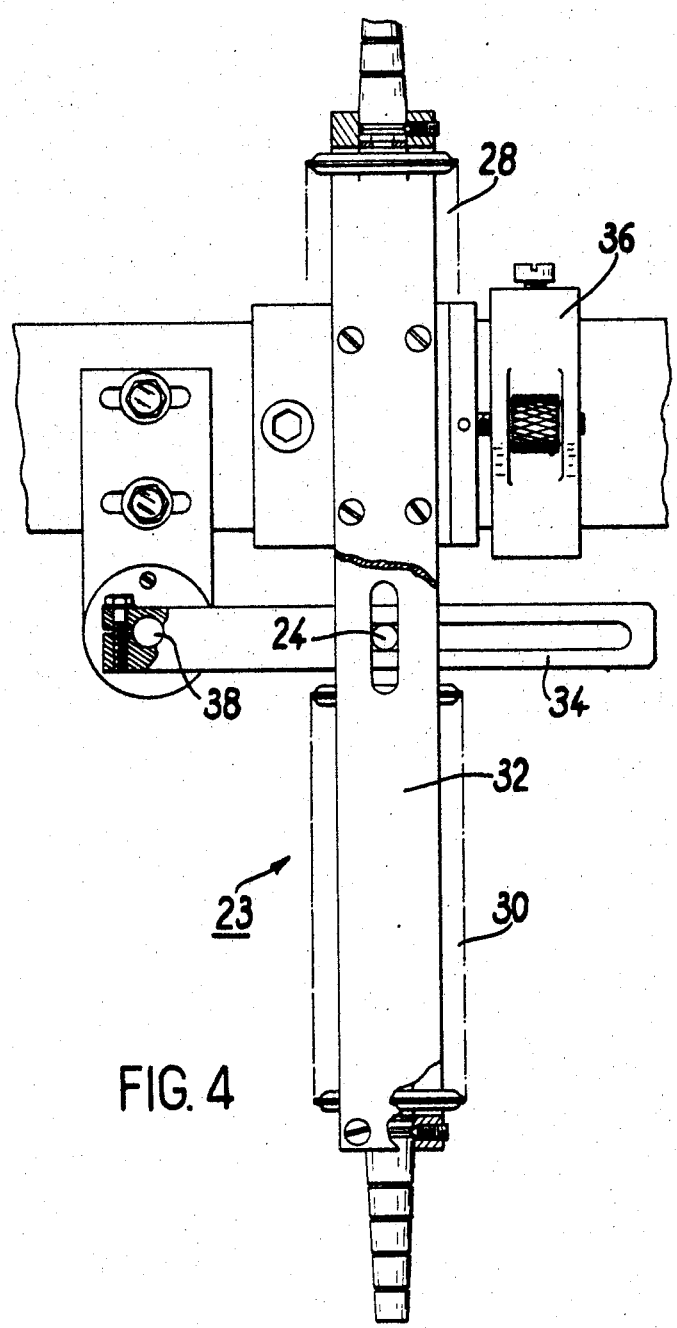

The invention will now be described by way of example with reference to the accompanying drawings in which:

FIGURE 1 is a schematic diagram illustrating the method according to the invention, FIGURE 2 is a general perspective of the apparatus according to the invention, FIGURE 3 is a section of a device providing a movement of translation proportional to the pressure variation of the gas in the band selector, FIGURE 4 illustrates the component of FIGURE 3 in a plane at right angles thereto, and FIGURE 5 shows the means for orientation of the optical plate.

Calculations will establish the relationship between the angles of rotation of the monochromator plate and the presure variation of the gas moving in the passband selector $\sigma_{SB}$ and the number of waves corresponding to the spectrum transmitted by the band selector, a gas pressure variation $dp$ entailing a variation in the number of waves:

$$(d\sigma)_{SB} = -\chi \sigma dp$$

being the characteristic coefficient of the said gas.

Also, the variation in the number of waves corresponding to the width of the monochromator spectrum is given by the following formula:

$$(d\sigma)_M = \frac{\sigma^2 e \cos i}{nKF} d\alpha$$

where:

e is the thickness of the optical plate, $i$ is the angle of emergence of the grating provided in the monochromator,
$n$ is the number of lines of the grating per cm.,
$K$ is the interference order used in this grating,
$F$ is the focal length of the grating monochromator, and
$d\alpha$ is the angle of rotation of the plate.

A simultaneous displacement of the spectra explored by the two devices (band selector and monochromator) is obtained if:

$$(d\sigma)_{SB} = (d\sigma)M$$

and this may also be written as follows:

$$d\alpha = \frac{-\chi nKF}{\sigma e \cos i} dp$$

It will be therefore be apparent that the plate rotation $d$ is proportional to the pressure variation $dp$ in the band selector chamber. However, it should be noted that the proportionality coefficient is proportional to $1/\sigma = \lambda$ where $\lambda$ is the operating wavelength.

The schematic diagram given in FIG. 1 illustrates the method according to the invention. It partially illustrates a spectrometer 2 comprising a monochromator 4 with a grating and a plate 6 and a band selector 10, the monochromator transmitting a fraction of the light emitted by the source 8 to the selector. The latter consists of two glass discs 12, 14 held parallel in a frame, a gas being contained between the two discs.

The monochromator entry slits 16 is illuminated by the source 8 and the transmitted light passes through the optical plate 6 before falling on the grating (not shown). The light reflected by the grating is applied to the exit slit 18, the emergent beam being directed to the passband selector 10.

The gas pressure in the band selector chamber is controlled by a device 20, the pressure variations governed by the latter are transmitted to a device 22 which controls the orientation of the optical plate 6 in such a manner that the angle of rotation of the optical plate is proportional to the pressure variation in the band selector.

FIG. 2 shows the device 22 while FIGS. 3, 4 and 5 show details thereof.

Referring to FIG. 2, a first device 23 is provided to displaced the rod 24 by an amount proportional to the pressure variation in the band selector chamber, and a device 26 (FIGS. 2 and 5) is provided to convert this displacement into a rotation of the optical plate 6.

Rod 24 is secured between two stacks of pressure capsules held in the device 23; a first stack 28 is connected to the band selector chamber and a second stack 30 is subjected to a reference pressure. Just a few capsules of each stack are shown in FIGS. 2–3 and 4.

The displacement of the rod 24 is obtained by the differential action of the pressure $p$ on the pressure capsules 28. Such pressure capsules are advantageous to use because of their linearity. The purpose of using the second stack 30 is to eliminate any atmospheric fluctuations.

When a pressure variation $dp$ occurs in the band selector chamber, the spectral interval explored is $d\sigma = -\chi \sigma dp$ and the rod 24 moves by an amount $dx = hndp$, $n$ being the number of capsules per stack and $h$ a characteristic coefficient of the capsules used.

The frame 32 in which the capsules are held is so constructed as to prevent movements of the rod 24 from being other than a pure movement of translation. The rectilinear displacements of the rod 24 produce angular displacements of the lever 24 which is secured to the shaft 38 driving the plate 6.

We saw that the proportionality coefficient between $d\alpha$ and $dp$ is a function of the wavelength; this proportionality coefficient must therefore be controlled continuously and this is achieved by varying the distance between the axis of rotation 38 and the rod 24 by displacement of the frame 32 bearing the capsules. A fine-adjustment 36 provides small displacements of the frame for adjustment purposes.

Calibration of the length of the lever arm, i.e. adjustment of the position of the frame 32, must be carried out before the apparatus is used. Such calibration is not very critical however. Experiment has shown that there is no need for readjustment when the selector band is within a range of up to 100 cm.$^{-1}$.

Before the pass-band of the selector 10 and of the monochromator 4 can be simultaneously shifted it is of course necessary to bring their central portions into register. Coarse adjustment is obtained by rotation of the monochromator grating (not shown) about its axis and fine adjustment is obtained by adjusting the reference pressure $p_1$ of the capsules 30 This adjustment produces a rod displacement $dx = hndp_1$ and produces a rotation of the plate 6.

What is claimed is:

1. Apparatus for simultaneously shifting the pass-band of respectively a grating type monochromator controlled by a variable orientation optical plate and a pass-band selector with gas under pressure forming a spectrometer comprising: a frame, a first stack of pressure capsules positioned in said frame, a second stack of pressure capsules positioned in said frame and subject to a reference pressure, a variable pass-band selector filled with gas under pressure, means for continuously subjecting said capsules of said first stack to the pressure of the gas in said selector, a rod positioned between said first and second stacks of pressure capsules, a lever, a pivot for said lever, means connecting said rod to said lever remote from said pivot whereby rectilinear movement of said stacks rotates said lever about said pivot, a rotatable transparent optical plate and means connecting said lever to said optical plate near said pivot for controlling the angular portion of said plate.

2. An apparatus according to claim 1 wherein said frame includes adjusting means for varying the position at which the rod engages the lever whereby said position varies linearly as a function of the mean wavelength of the band of radiation under study.

References Cited

UNITED STATES PATENTS 3,163,693  12/1964  Saunderson et al.
3,373,651  3/1968  Mack et al.

ROLAND L. WIBERT, Primary Examiner

F. L. EVANS, Assistant Examiner

U.S. Cl. X.R.

350—285